J. YOUNG.
Churn.
No. 7,046.
Patented Jan'y 22, 1850.
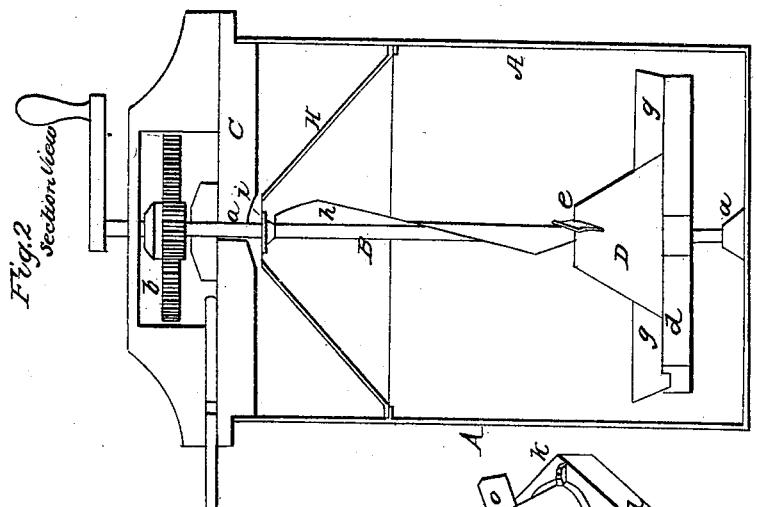
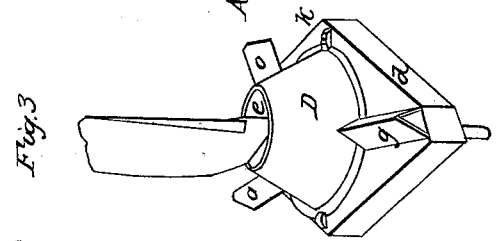
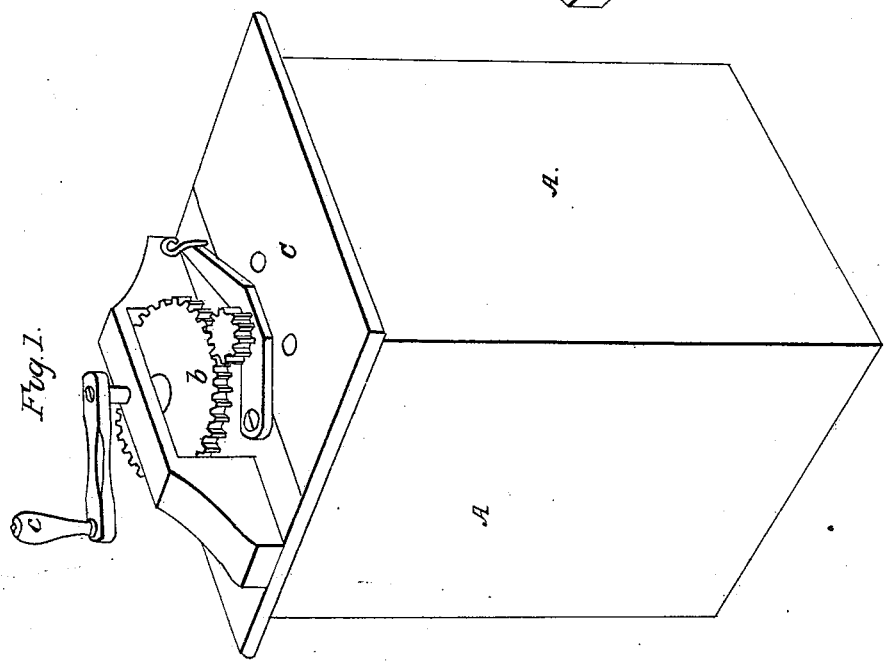

UNITED STATES PATENT OFFICE.

JOHN YOUNG, OF WEST GALWAY, NEW YORK.

ATMOSPHERIC CHURN.

Specification of Letters Patent No. 7,046, dated January 22, 1850.

*To all whom it may concern:*

Be it known that I, JOHN YOUNG, of West Galway, in the county of Fulton and State of New York, have invented certain new and useful Improvements in Atmospheric Churns, of which the following is a full, clear, and exact description, reference being had to the accompanying drawing, which forms part of this specification, and in which—

Figure 1 represents a perspective view of the churn complete, Fig. 2 is an elevation of the same with a portion of the tub removed to show the interior, and Fig. 3 is a perspective view of a portion of the dasher.

My invention consists in so constructing the dasher that in its rotation a large quantity of air is mingled with the milk; also in so constructing the churn tub that it effectually prevents the milk from splashing out of the churn without interfering with the free action of the dasher.

In the drawing A is the churn tub which may be either round or square and constructed of such materials as the manufacturer may deem suitable. Within this tub a spindle B is supported in suitable bearings, $a$, the upper extremity of this spindle passes through the churn cover C, and has a pinion secured to it which gears into a wheel, $b$, mounted on the cover, and having a crank $c$ secured to its spindle. A flat plate $d$ is attached to the lower extremity of the spindle and this is surmounted by an inverted conical vessel D open at its top $e$. On the upper side of the plate $d$ is placed inverted gutters or channels $g, g$, whose inner extremities are secured to and communicate with the interior of the conical vessel D, and whose outer extremities are open. A spiral wing $h$, is secured to the spindle, and extended from the conical vessel to the churn cover.

An inverted pyramidal or conical vessel H (depending upon the shape of the churn tub) is supported on brackets secured to the sides of the churn tub. This vessel has an opening at its top, through which the spindle of the dasher passes. It is fitted loosely into the tub so that any milk which may be thrown upward by the action of the dasher will run down again into the body of the tub; a small disk $i$, is attached to the upper extremity of the dasher spindle which partially closes the hole left in the top of the vessel H and effectually prevents the milk from splashing against the lid.

When the churn is supplied with milk and the dasher is rapidly turned by the application of power to the handle of the crank, the whole mass of milk is put in motion and a whirl is created around the spindle, through this whirl the air descends into the conical vessel D, from which it is discharged centrifugally through the channels $g, g$, and thus mingled with the milk.

I prefer to construct the conical vessel, D, and its radiating channels, $g$, independent of the spindle and disk and to attach them thereto by buttons, $k$, or screws, in order that they may the more readily be removed and cleaned.

When the churn is filled very full with the milk or cream to be churned, the wings $o$ on the upper edge of the cone D are of great advantage to the process as by their centrifugal action they both keep the entrance into the cone open to permit the free descent of the air and likewise distribute a very considerable quantity of air among the cream within the sphere of their action.

What I claim as my invention and desire to secure by Letters Patent is—

The combination of the inverted vessel (H) and the disk ($i$) on the stem of the dasher to prevent the splashing out of the cream at the churn lid.

JOHN YOUNG.

Witnesses:
JAMES KENNEDY,
JAMES DAVIS.